United States Patent [19]

Soung

[11] Patent Number: 5,703,776
[45] Date of Patent: Dec. 30, 1997

[54] METHOD AND DEVICE FOR MEASURING SLOPE OF DRIVING ROAD

[75] Inventor: Gwang-Geong Soung, Seoul, Rep. of Korea

[73] Assignee: Hyundai Motor Company, Ltd., Seoul, Rep. of Korea

[21] Appl. No.: 417,016

[22] Filed: Apr. 5, 1995

[30] Foreign Application Priority Data

Apr. 6, 1994 [KR] Rep. of Korea ............... 947183

[51] Int. Cl.[6] ............... G06G 7/70; G06F 7/70
[52] U.S. Cl. ............... 364/424.094; 364/424.083; 364/426.025; 364/426.042; 477/37; 477/44
[58] Field of Search ............... 364/424.1, 424.01, 364/426.02, 426.01, 423.098, 424.094, 424.091, 424.089, 424.083, 424.085, 426.025, 426.029, 426.042, 426.043; 477/68, 34, 37, 121, 131, 120, 504, 97, 11, 18, 44, 92, 32, 48; 73/509, 146, 178 R, 514.37, 9; 280/707

[56] References Cited

U.S. PATENT DOCUMENTS

| | | | |
|---|---|---|---|
| 4,882,693 | 11/1989 | Yopp | 364/426.01 |
| 5,123,715 | 6/1992 | Okubo | 364/426.02 |
| 5,132,906 | 7/1992 | Sol et al. | 364/426.02 |
| 5,351,540 | 10/1994 | Gee | 73/178 R |
| 5,410,477 | 4/1995 | Ishii et al. | 364/424.01 |
| 5,446,658 | 8/1995 | Pastor et al. | 364/426.02 |

FOREIGN PATENT DOCUMENTS

| | | |
|---|---|---|
| 0139982 | 5/1985 | European Pat. Off. . |
| 0377953 | 7/1990 | European Pat. Off. . |
| 0454504 | 10/1991 | European Pat. Off. . |
| 4328893 | 3/1994 | Germany . |

*Primary Examiner*—Jacques Louis-Jacques
*Attorney, Agent, or Firm*—Birch, Stewart, Kolasch & Birch, LLP

[57] ABSTRACT

A device and method for measuring the slope of a road on which a vehicle travels, which includes a gear position sensing member for outputting a corresponding signal after sensing the gear position, or a car speed sensing member for outputting a corresponding signal after a driving speed of the vehicle, an engine revolution sensing member for outputting a corresponding signal after sensing the engine revolution number, a loading degree sensing member for outputting a corresponding signal after sensing the loading degree which is changed by a driving condition of the vehicle, a brake pedal sensing member for outputting a corresponding signal after sensing the brake pedal operation which is changed by the operation of the brake pedal, and an engine controlling member connected to the gear position sensing member, or the car speed sensing member, the engine revolution sensing member, the loading degree sensing member, and the brake pedal sensing member, whereby the engine controlling member calculates an engine torque when the error value is within the setting value, and finally measures the slope of a road surface by using the calculated engine torque.

15 Claims, 2 Drawing Sheets

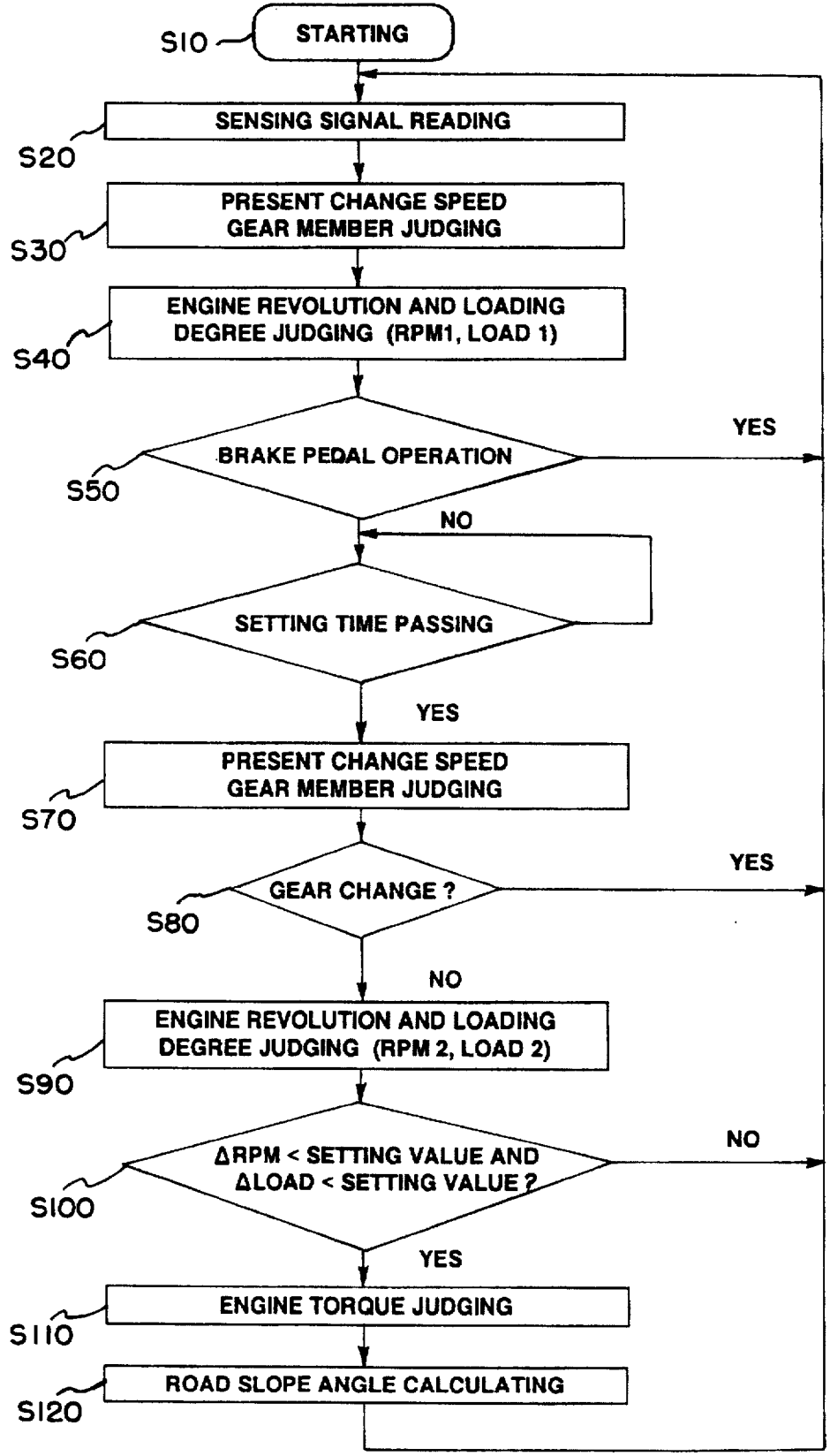

METHOD AND DEVICE FOR MEASURING SLOPE OF DRIVING ROAD

BACKGROUND OF THE INVENTION

1. Field of the Invention

The present invention relates to a method and device for measuring the scope of a road on which a vehicle travels by utilizing an engine torque which is changed by a driving state of the vehicle, without any additional device to be installed on the vehicle.

2. Description of Related Art

Generally, the driving state of a vehicle is smoothly accomplished by controlling an air and fuel combination ratio or fuel ignition timing according to the intention of a driver who controls the driving state in accordance with gear changes, utilizing the accelerator pedal, brake pedal, and the like. Therefore, driving power or driving speed of the vehicle matches the present driving condition.

However, in fact, the driving performance of the vehicle is different even though the intention of the driver matches with the road condition or circumstance. If there is no consideration for the driving intention of the vehicle when controlling the operating state of the vehicle, the controlling operation is not accomplished, so that fuel or power torque is wasted and imperfect combustion percentage is high due to improper control of the air and fuel combination ratio.

A vehicle having an auto gear change device closely follows the driver's operation since the gear change operation is automatically accomplished in response to the driving condition of the vehicle. Besides, the vehicle can perform by completing a gear change operation according to the slope degree of the driving road on which the vehicle travels. In this time, shock of the gear change can be eliminated.

Also, in order to improve riding comfort for passengers in the vehicle, there is a suspension device installed which can smoothly change its operation in response to the driving condition and road condition. Therefore, the driving road condition should be analyzed in order to improve the riding comfort for the passenger who uses the vehicle.

Various types of conventional devices for measuring the surface slope of a driving road are well known in the art. Such conventional devices include a water tank or a pendulum which are changed by the slope of the surface.

However, such conventional water tanks or pendulums can be affected by the slope of a driving road as well as various speed values of a vehicle, so that they produce a large error compared with a real slope of the road surface. Other disadvantages include the difficulty of performing a proper and corresponding controlling operation according to the degree of the slope of a road surface, it is very expensive to install an additional device to the vehicle, and it is difficult to design a new space within the vehicle.

SUMMARY OF THE INVENTION

Accordingly, it is an object of the present invention to provide an improved device and method for measuring the slope of a road surface on which a vehicle travels, which eliminates the above problems encountered with conventional measuring devices and methods.

Another object of the present invention is to provide a device for measuring the slope of a road surface, which includes a gear position sensing member, an engine revolution sensing member, a loading degree sensing member, a brake pedal operation sensing switch, and an engine controlling device connected to the above elements for measuring the slope of the road surface.

A further object of the invention is to provide a device for measuring the slope of a road surface, which includes a car speed sensing member, an engine revolution sensing member, a loading degree sensing member, a brake pedal operation sensing switch, and an engine controlling device connected to the above elements for measuring the slope of the road surface.

Still another object of the present invention is to provide a method for measuring the slope of the road surface, which comprises the steps of judging a change speed gear member, judging an engine revolution number and loading degree, judging a position of the change speed gear member, judging a calculated error of the engine rotating number and loading degree compared with a setting value when the position of change speed gear members and measuring the slope of a road surface when the above error value is less than the setting value.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, a device and method for measuring the slope of a road on which a vehicle travels, which includes a gear position sensing member for outputting a corresponding signal after sensing the gear position, or a car speed sensing member for outputting a corresponding signal after sensing a driving speed of the vehicle, an engine revolution sensing member for outputting a corresponding signal after sensing the engine revolution, a loading degree sensing member for outputting a corresponding signal after sensing the loading degree which is changed by a driving condition of the vehicle, a brake pedal sensing member for outputting a corresponding signal after sensing the brake pedal operation which is changed by the operation of the brake pedal, and an engine controlling member connected to the gear position sensing member, or the car speed sensing member, the engine revolution sensing member, the loading degree sensing member, and the brake pedal sensing member, whereby the engine controlling member calculates an engine torque when the error value is within the setting value, and finally measure the slope of a road surface by using the calculated engine torque.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIG. 3 shows the operating sequence of the method for measuring the slope of a road surface on which a vehicle travels.

DESCRIPTION OF THE PREFERRED EMBODIMENTS

Figure 1:
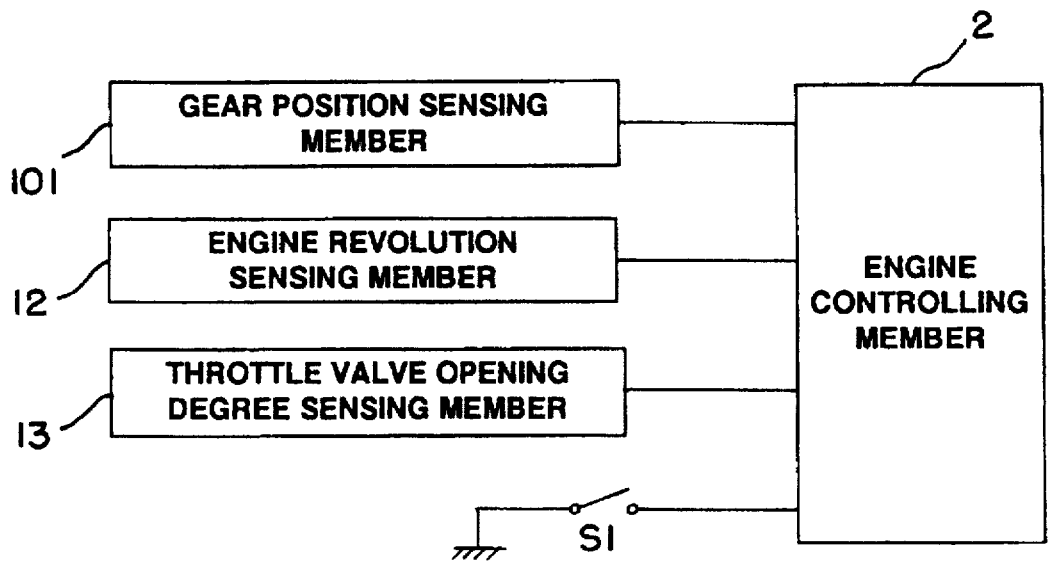
FIG. 1 is a block diagram of a device for measuring the slope of a road surface on which a vehicle travels according to the present invention.

Referring now in detail to the drawings for the purpose of illustrating preferred embodiments of the present invention, the method and device for measuring the slope of a road surface on which a vehicle travels as shown in FIGS. 1 and 3, comprises a gear position sensing member 101 for outputting a corresponding electric signal after sensing a position of a transmission (change speed) gear, an engine revolution sensing member 12 for outputting a corresponding electric signal after sensing the engine revolution, a throttle valve opening degree sensing member 13 for outputting a corresponding electric signal after sensing the opening degree of the throttle valve, a brake pedal operation sensing switch S1 for changing the movement state according to the movement state of a brake pedal.

The measuring device of the present invention further comprises an engine controlling member 2 for measuring the slope of a road surface on which a vehicle travels, which is connected to the gear position sensing member 101, the engine revolution sensing member 12, and the throttle valve opening degree sensing member 13.

Figure 2:
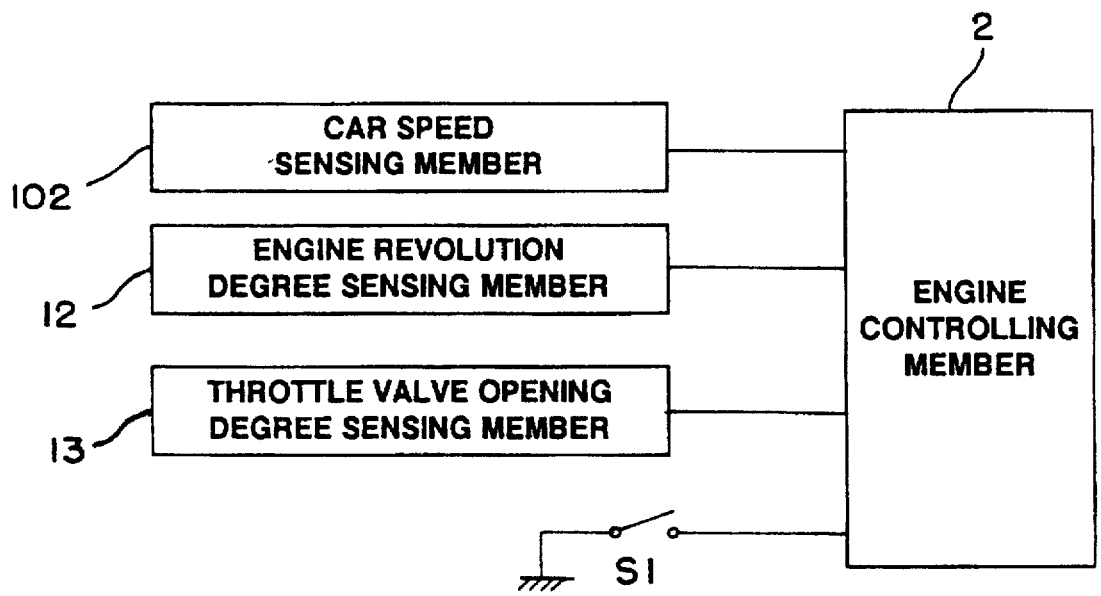
FIG. 2 is a block diagram of another embodiment of the device for measuring the slope of a road surface on which a vehicle travels according to the present invention.

Referring in detail to FIG. 2, there is illustrated a second embodiment of a method and device for measuring the slope of a road surface on which a vehicle travels. The device for measuring the slope of road according to the present invention comprises a car speed sensing member 102 for outputting a corresponding electric signal after sensing a car driving speed, the engine revolution sensing member 12 for outputting a corresponding electric signal after sensing the engine revolution, the throttle valve opening degree sensing member 13 for outputting a corresponding electric signal after sensing the opening degree of the throttle valve, and the brake pedal operation sensing switch S1 for changing the movement state according to the movement state of a brake pedal.

The measuring device of the present invention further comprises engine controlling member 2 for measuring the slope of a road surface on which a vehicle travels, which is connected to the car speed sensing member 102, the engine revolution sensing member 12, and throttle valve opening degree sensing member 13.

The measuring device of the slope of the road surface on which a vehicle travels according to the present invention operates as follows. As shown in FIG. 1, the engine controlling member 2 starts to operate (S10) when an electric power source is properly charged to all members of the device.

First of all, the engine controlling member 2 reads (S20) the electric signal transmitted by a corresponding sensing member so as to judge the position of transmission gear. Accordingly, if a vehicle has the gear position sensing member 101 for outputting a corresponding electric signal after sensing the position of the transmission gear, the present gear position sensing member 101 reads the electric signal transmitted by the corresponding sensing member and judges (S30) the position of transmission gear.

However, if a vehicle does not include the gear position sensing member 101, it judges the position of transmission by using an engine revolution number (RPM1) and a loading degree (LOAD1). Therefore, the engine controlling member 2 reads the electric signal transmitted by the car speed sensing member 102 and the engine revolution sensing member 12 and judges the car speed and the engine revolution number.

If the radius of the tire is R, the revolution number of the car engine is N, the car driving speed is V, and pi ($\pi$) is 3.141592, the present gear ratio of the car can be calculated by the following expression (1):

$$\text{gear ratio} = \frac{2 \times \pi \times R \times N}{100 \times V} \quad (1)$$

Therefore, if the gear ratio of the present operating transmission gear is calculated, the engine controlling member 2 can judge a position of the present gearing and operating transmission member by using the calculated gear ratio and a stored data of the transmission member. Accordingly, if the position of the present geared transmission gear member judges (S30), the engine controlling member 2 judges (S40) a revolution number (RPM1) and a loading degree (LOAD1) of the vehicle engine so as to judge the present driving state of the present vehicle.

That is, the engine controlling member 2 judges the present operating engine revolution number by using the electrical signal which is transmitted to the engine revolution sensing member 12. Also, the engine controlling member 2 judges the present load of a vehicle by using the electrical signal which is transmitted to the throttle valve opening in the degree sensing member 13.

A judging method of the loading degree of a vehicle is not only judgment of the throttle valve opening degree, but also judgment of air pressure of a surge tank by the engine controlling member 2. Therefore, the engine controlling member 2 can judge the loading degree of a vehicle without any additional equipment installed to the vehicle.

The engine controlling member 2 can judge (S50) whether the brake pedal is operated by a driver through use of the electrical signal which is transmitted to the brake pedal operation sensing switch S1. The brake pedal operation sensing switch S1 is in an on-position of an on/off switch if the driver pushes the brake pedal until reaching a predetermined position of the brake pedal.

Therefore, when the brake pedal operation sensing switch S1 is in an on-position, the vehicle expresses the state of reduction of the driving speed thereof or a state of stop of a desired position thereof. When the brake pedal operation sensing switch S1 is in an off-position, the vehicle expresses the state of non-operation of the brake pedal.

Accordingly, if the brake pedal operation sensing switch S1 is in an on-position and the corresponding electrical signal transmits to the engine controlling member 2, the engine controlling member 2 judges that the brake pedal is operating and then does not measure the slope of a road surface and goes to a beginning stage (S20). At this time, the slope of the driving road uses a former measured slope value as a present slope value of the road surface.

While a brake member is operating, it is impossible to properly evaluate the engine status of the vehicle when the brake member is operating, it is difficult to properly judge the change of changeable outputting power of the engine and the change of each resistance coefficient. There are a number of problems, such as the inability to measure the slope degree of the road surface. Accordingly, it is a process of protecting improper controlling operation based on a wrong slope degree of the road surface.

However, if the brake pedal operation sensing switch S1 is in an off-position, the engine controlling member 2 judges (S60) whether a predetermined time has elapsed after the engine controlling member 2 judges the geared and operating transmission gear member.

Therefore, after passing the determined elapsed time, the engine controlling member 2 judges the geared transmission gear member (S70) by using a sensing signal transmitted from the gear position sensing member 101, or judges again after the gear ratio is calculated by utilizing the formula (1) and by using the car speed or the engine rotating number which is judged by the car speed sensing member 102 or the engine revolution sensing member 12. Thereafter, the engine controlling member 2 judges a corresponding transmission gear member after a predetermined time has elapsed. However, after judging the position of the transmission gear member, if the elapsed time does not equal the predetermined time, the engine controlling member 2 checks (S60) the elapsed time continuously.

As mentioned above, after a certain time has elapsed, if a geared transmission gear member is checked, the engine controlling member 2 judges (S80) whether the position of transmission gear member changes and the gear transmission operation is accomplished.

If the gear transmission operation is accomplished after the geared transmission gear member changes for the certain time, the engine revolution number and the car driving speed change and a certain time is required until driving operation of the vehicle is stably accomplished so that it is impossible to judge correct state of the vehicle.

Accordingly, the engine controlling member 2 goes back to the beginning stage (S20) and repeats the above procedure so that an error of the slope can be eliminated when the car state changes and transmission operation is accomplished.

But if the geared transmission gear member does not change, the engine controlling member 2 judges (S90) a revolution number (RPM2) and a loading degree (LOAD2) of the vehicle engine. Also, the engine controlling member 2 calculates the error between the engine revolution number (RPM2) and loading degree (LOAD1) at the state (S40), and the engine revolution number (RPM2) and loading degree (LOAD2). Thereafter, the engine controlling member 2 judges (S100) the calculated value compared with a set value.

If the error value of the engine revolution number and loading degree (ΔRPM, ΔLOAD) is less than the set error value, the engine controlling member 2 judges that the driving condition and driving state do not change. Accordingly, the engine controlling member 2 calculates (S110) a corresponding torque of the vehicle engine by using data of a respective corresponding value according to change of the engine revolution number and loading degree, which are memorized in a corresponding number of a memory device.

However, if the error value of the engine revolution number and loading degree (ΔRPM, ΔLOAD) is more than the set error value, the engine controlling member 2 changes the driving state of the vehicle in response to a change of driving road state or sudden change of circumstances. Specifically, when the car is driving on an unpaved road such as a rugged road or a gravel road, even if the driving condition is the same, the calculated slope value is quite different.

Accordingly, if the error value of the engine rotating number and loading degree (ΔRPM, ΔLOAD) is more than the set error value, the engine controlling member 2 does not calculate the slope value of the road surface until the driving state of the vehicle is stable and only uses the slope value of the former stage.

As mentioned above, if the engine torque is calculated according to the present engine revolution number and loading degree, the engine controlling member 2 judges (S120) a set angle θ according to a calculated SIN value as a slope value of the driving road after the engine controlling member 2 calculates a SIN value about a slope degree of the present driving road by using the following expression (2):

$$\text{SIN}\theta = \frac{\frac{TQ \times I \times \eta}{R} - (A \times V^2 + C) - (M + M_1) \times \frac{dv}{dt}}{M \times G} \quad (2)$$

wherein TQ is an engine torque, I is a gear ratio of a geared gear, η is a coefficient of efficiency, A is a coefficient of an air resistance of the car body, C is a coefficient of tire driving of the car, M is the total weight of a vehicle, $M_1$ is an inertia power of rolling parts, dt is quality of time change, dv is quality of driving speed change, R is radius of the tire, and G is gravity.

Accordingly, the device and method of the present invention can read and utilize, if necessary, the slope value memorized in a corresponding number of the memory device after calculating the slope value of the present road surface by using the engine torque which can be changed by driving circumstance of the vehicle without any additional device to be installed to the car body.

Furthermore, since the device and method of the present invention only uses the sensing devices installed to the vehicle body, it is inexpensive to manufacture, does not need any change of design of the vehicle, is easy to judge the slope degree of the road surface so that operation of the transmission and suspension is controlled properly and correctly and the vehicle can be safely driven and provides a good feeling for passengers who ride in the vehicle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A device for measuring the slope of a road surface on which a vehicle travels, said device comprising:

a gear position sensing member for outputting a corresponding electrical signal after sensing a position of a transmission gear member;

an engine revolution sensing member for outputting a corresponding electrical signal after sensing a number of an engine revolution;

a loading degree sensing member for outputting a corresponding electrical signal after sensing a loading degree which is changed by a driving state of the vehicle;

a brake pedal operating state sensing member for sensing an operating state of a brake pedal, which is changed by an operating state of a brake pedal; and an engine controlling member connected to said gear position sensing member, said engine revolution sensing member, said loading degree sensing member, and said brake pedal operating state sensing member, whereby the engine controlling member measures the slope of the road surface by using a calculated engine torque after the engine controlling member judges the position of the transmission gear member by said gear position sensing member, and if the transmission gear member does not change and if the brake pedal is not operated, the engine controlling member calculates an error set value of the engine revolution and loading degree by comparing sensed engine revolution and loading degree data with a predetermined set value of the engine revolution and leading degree, and the engine controlling member calculates an engine torque if said calculated error set value of the engine revolution and loading degree is less than said predetermined set value, wherein said calculated engine torque is used to measure the slope of the road surface on which the vehicle travels.

2. The device of claim 1, wherein said loading degree sensing member utilizes a throttle valve opening degree sensing member for outputting a corresponding electrical signal after sensing a throttle valve opening degree.

3. The device of claim 2, wherein said loading degree sensing member utilizes a device for outputting a corresponding electrical signal of a fuel quantity which sprays to a combustion room of a vehicle engine.

4. The device of claim 2, wherein said loading degree sensing member utilizes a device for outputting a corresponding electrical signal of a pressure in a surge tank.

5. The device of claim 1, said engine controlling member utilizes the following expression:

$$SIN\theta = \frac{\frac{TQ \times I \times \eta}{R} - (A \times V^2 + C) - (M + M_1) \times \frac{dv}{dt}}{M \times G},$$

wherein TQ is an engine torque, I is a gear ratio of a geared gear, η is a coefficient of efficiency, A is a coefficient of an air resistance of the car body, C is a coefficient of tire driving of the car, M is the total weight of the car body, $M_1$ is an inertia power of rolling parts, dt is quality of time change, dv is quality of driving speed change, R is radius of the tire, and G is gravity.

6. A device for measuring the slope of a road on which a vehicle travels, said device comprising:

a car speed sensing member for outputting a corresponding electrical signal after sensing a car speed of the vehicle;

an engine revolution sensing member for outputting a corresponding electrical signal after sensing a number of an engine revolution;

a loading degree sensing member for outputting a corresponding electrical signal after sensing a loading degree which is changed by a driving state of the vehicle;

a brake pedal operating state sensing member for sensing, an operating state of a brake pedal, which is changed by an operating state of a brake pedal; and an engine controlling member connected to said car speed sensing member, said engine revolution sensing member, said loading degree sensing member, and said brake pedal operating state sensing member, whereby the engine controlling member measures the slope of the road by using a calculated engine torque after the engine controlling member judges the position of the transmission gear member by said engine revolution sensing member and said loading degree sensing member, and if the transmission gear member does not change, the engine controlling member calculated an error set value of the engine revolution and loading degree by comparing sensed engine revolution and loading revolution and loading degree data with a predetermined set value of engine revolution and loading degree, and the engine controlling member calculates an engine torque if said calculated error set value of the engine revolution and loading degree is less than said predetermined value, wherein said calculated engine torque is used to measure the slope of the road surface on which the vehicle travels.

7. The device of claim 6, wherein said loading degree sensing member utilizes a throttle valve opening degree sensing member for outputting a corresponding electrical signal after sensing a throttle valve opening degree.

8. The device of claim 7, wherein said loading degree sensing member utilizes a device for outputting a corresponding electrical signal of a fuel quantity which sprays to a combustion room of a vehicle engine.

9. The device of claim 7, wherein said loading degree sensing member utilizes a device for outputting a corresponding electrical signal of a pressure in a surge tank.

10. The device of claim 6, wherein said engine controlling member utilizes the following expression:

$$SIN\theta = \frac{\frac{TQ \times I \times \eta}{R} - (A \times V^2 + C) - (M + M_1) \times \frac{dv}{dt}}{M \times G},$$

wherein TQ is an engine torque, I is a gear ratio of a geared gear, η is a coefficient of efficiency, A is a coefficient of an air resistance of the car body, C is a coefficient of tire driving of the car, M is the total weight of the car body, $M_1$ is an inertia power of rolling parts, dt is quality of time change, dv is quality of driving speed change, R is radius of the tire, and G is gravity.

11. A method for measuring a value of the slope of a road on which a vehicle travels, said method comprises the steps of:

judging a change of a transmission gear member;

judging an engine revolution and a loading degree by using a signal which transmitted to an engine rotating number and a loading degree sensing members, respectively;

judging an operation state of said transmission gear member;

judging an error set value of said engine revolution and said loading degree by comparing sensed engine revolution and loading degree data with a predetermined set value of engine revolution and loading degree if the position of said change and if said brake pedal is not operated gear member does not change; and judging an engine torque according to the engine revolution and loading degree if said error set value of the engine revolution and the loading degree is less than said predetermined set value, wherein said calculated engine torque is used to measured the slope of the rod surface on which the vehicle travels.

12. The method of claim 11, wherein said judgment of said geared change speed gear member utilizes an electrical signal output from a gear position sensing member.

13. The method of claim 12, wherein said judgment of said gear change speed gear member utilizes an electrical signal output from a car speed sensing member and an engine revolution sensing member.

14. The method of claim 11, wherein said calculation of an angle of the slope of the road utilizes the following expression:

$$\sin\theta = \frac{\frac{TQ \times I \times \eta}{R} - (A \times V^2 + C) - (M + M_1) \times \frac{dv}{dt}}{M \times G},$$

wherein TQ is an engine torque, I is a gear ratio of a geared gear, η is a coefficient of efficiency, A is a coefficient of an air resistance of the car body, C is a coefficient of tire driving of the car, M is the total weight of the car body, $M_1$ is an inertia power of rolling parts, dt is quality of time change, dv is quality of driving speed change, R is radius of the tire, and G is gravity.

15. The method of claim 11, wherein said measurement of a value of the slope of the road equals a former value of the slope of the road if said brake pedal is operated, said brake pedal generates a signal which is transmitted to a brake pedal operation sensing member.

* * * * *